(12) United States Patent
Kokubo et al.

(10) Patent No.: US 7,465,162 B2
(45) Date of Patent: Dec. 16, 2008

(54) TRANSCRIPT APPARATUS

(75) Inventors: Mitsunori Kokubo, Numazu (JP);
Kazunori Urushibata, Shizuoka (JP);
Haruyuki Matsubayashi, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 165 days.

(21) Appl. No.: 11/415,130

(22) Filed: May 2, 2006

(65) Prior Publication Data
US 2006/0257514 A1   Nov. 16, 2006

(30) Foreign Application Priority Data
May 10, 2005   (JP)   ............... 2005-137368

(51) Int. Cl.
*B28B 11/08* (2006.01)

(52) U.S. Cl. .................. 425/385; 425/388; 425/149

(58) Field of Classification Search ............. 425/385, 425/387.1, 388, 149
See application file for complete search history.

(56) References Cited

U.S. PATENT DOCUMENTS

| | | | |
|---|---|---|---|
| 3,828,842 A | | 8/1974 | Tagnon |
| 4,316,712 A | * | 2/1982 | Medendorp ............ 425/292 |
| 4,878,826 A | * | 11/1989 | Wendt ................. 425/384 |
| 4,907,956 A | | 3/1990 | Ezaki et al. |
| 4,969,812 A | * | 11/1990 | Brown ................. 425/398 |
| 5,496,433 A | | 3/1996 | Miyashita et al. |
| 6,364,648 B1 | | 4/2002 | Bishop et al. |
| 6,416,311 B1 | | 7/2002 | Springer et al. |
| 6,699,425 B1 | | 3/2004 | Reuther et al. |
| 6,808,443 B2 | | 10/2004 | Halley |
| 7,070,405 B2 | | 7/2006 | Sreenivasan et al. |
| 7,140,861 B2 | | 11/2006 | Watts et al. |
| 7,150,622 B2 | | 12/2006 | Choi et al. |

(Continued)

FOREIGN PATENT DOCUMENTS

DE   10 2006 018 139 A1   3/2007

(Continued)

OTHER PUBLICATIONS

Stephen Y. Chou et al., "Nanoimprint Lithography", J. Vac. Sci. Technol. B, vol. 14, No. 6, pp. 4129-4133 (1996).

(Continued)

*Primary Examiner*—Yogendra Gupta
*Assistant Examiner*—Maria Veronica D Ewald
(74) *Attorney, Agent, or Firm*—DLA Piper LLP US

(57) ABSTRACT

A transcript apparatus has a vacuum-forming chamber 60 in which a transcription die 41 and a forming product 13 transcribed from the die 41 are disposed face to face with each other, a movable body 19 supporting one of the die 41 and the product 13 to allow the die 41 and the product 13 to be movable closer to or away from each other, a balance cylinder 50 placed in parallel to a moving direction of the movable body 19 and connected to the movable body 19 via a piston rod 52, a pressure detector 64 detecting a pressure inside the chamber 60, and a pressure control section 68 operative to control a pressure of working fluid supplied to the chamber 60 depending on an output from the pressure detector 64 to cancel fluctuation in load acting on the movable body 19 in the moving direction thereof.

2 Claims, 3 Drawing Sheets

U.S. PATENT DOCUMENTS

| | | | |
|---|---|---|---|
| 7,204,686 B2 * | 4/2007 | Chung et al. | 425/385 |
| 2004/0200368 A1 | 10/2004 | Ogino et al. | |
| 2005/0089597 A1 | 4/2005 | Ito | |
| 2006/0037406 A1 * | 2/2006 | Dharia | 73/818 |
| 2006/0193938 A1 | 8/2006 | Iimura et al. | |
| 2006/0233906 A1 | 10/2006 | Kukubo et al. | |

FOREIGN PATENT DOCUMENTS

| | | |
|---|---|---|
| JP | 2004-034300 | 2/2004 |
| JP | 2004-288784 | 10/2004 |
| JP | 2004-358857 | 12/2004 |

OTHER PUBLICATIONS

Office Action in U.S. Appl. No. 11/404,799 mailed Feb. 6, 2008.
German Office Action issued on Aug. 3, 2007, in related Application No. 10 2006 021 507.9.
English translation of German Office Action issued on Aug. 3, 2007, in related Application No. 10 2006 021 507.9.
Non-Final Office Action; U.S. Appl. No. 11/439,291 mailed Jan. 10, 2008.
English Translation of Taiwanese IPO Search Report issued in Application No. 095114106 mailed Jan. 31, 2008.
Taiwanese IPO Search Report issued in Application No. 095114106 mailed Jan. 31, 2008.
B.J. Choi et al., "Design of orientation stages for step and flash imprint lithography", Precision Engineering Journal of the International Societies for Precision Engineering and Nanotechnology, 25 (2001) pp. 192-199.
English language abstract of TW 368465.
English language abstract of TW 476700, published Feb. 21, 2002.
English language abstract of TW 458882, published Oct. 11, 2001.
English language abstract of TW 200413159.
English language abstract of JP 2004-034300, published Feb. 5, 2004.
Office Action in Korean Application No. 10-2006-34744.
English translation of Korean Office Action (KR Appl. No. 10-2006-34744).
Machine translation of JP Publication No. 2004-034300.
Machine translation of JP Publication No. 2004-358857.
Notice of Allowance issued in U.S. Appl. No. 11/404,799 mailed Jul. 9, 2008.
Notice of Allowance issued in U.S. Appl. No. 11/439,291 mailed Jul. 30, 2008.

* cited by examiner

TRANSCRIPT APPARATUS

BACKGROUND OF THE INVENTION

The present invention relates to transcript apparatuses wherein a finely engraved pattern formed on a surface of a die is transcribed onto a surface of a forming product using lithographic technology and, more particularly, to a transcript apparatus wherein a die and a forming product are disposed in a vacuum-forming chamber.

Since transcript apparatuses of this kind often give rise to a forming defect because of air or inactive gas (as an forming atmosphere) shut into a space between a die and a forming product, a transcript apparatus disclosed in Japanese Patent Provisional Publication No. 2004-288784 allows a die and a forming product to be disposed in an openable and closable vacuum-forming chamber.

SUMMARY OF THE INVENTION

The transcript apparatus has a movable member movably that supports one of the die and the forming product, and a member that faces and brings into abutting engagement with the movable member. To move the die and the forming product closer to or away from each other when the die and the forming product are located in the vacuum-forming chamber, the transcript apparatus makes a cross section of the movable member for the vacuum-forming chamber different from a cross section of the member for the vacuum-forming chamber. Here the cross section for the vacuum-forming chamber means a cross sections perpendicular to a moving direction of the movable member. Therefore a pressure inside the vacuum-forming chamber fluctuates when the vacuum-forming chamber is depressurized, and this causes to vary load acting on the movable member in the moving direction. Consequently, the movable member is pulled down toward the vacuum-forming chamber.

Such force acts on a drive section of the movable member to adversely affect the control of force pressing the die to the forming product. This makes it difficult to perform the appropriate forming.

The present invention has been completed with the above issues in mind and has an object to provide a transcript apparatus that can perform the forming in a simple and appropriate fashion minimizing adverse affect arising from pressure variation in a vacuum-forming chamber.

A first aspect of the present invention provides a transcript apparatus comprising: a vacuum-forming chamber in which a transcription die and a forming product to which a pattern is transcribed from the transcription die are disposed face to face with each other; a movable body supporting one of the transcription die and the forming product so as to allow the transcription die and the forming product to be movable closer to or away from each other; a balance cylinder placed in parallel to a moving direction of the movable body and connected to the movable body via a piston rod; a pressure detector detecting a pressure inside the vacuum-forming chamber; and a pressure control section controlling a pressure of working fluid supplied to the vacuum-forming chamber depending on an output from the pressure detector so as to cancel or reduce fluctuation in load acting on the movable body in the moving direction thereof due to pressure variation in the vacuum-forming chamber.

A second aspect of the present invention provides a transcript apparatus comprising: a vacuum-forming chamber in which a transcription die and a forming product to which a pattern is transcribed from the transcription die are disposed face to face with each other; a movable body supporting one of the transcription die and the forming product so as to allow the transcription die and the forming product to be movable closer to or away from each other; and a plurality of balance cylinders placed in parallel to a moving direction of the movable body and connected to the movable body via piston rods, respectively, wherein the number of balance cylinders to be actuated is changed according to a given setting condition for a pressure state in the vacuum-forming chamber.

A third aspect of the present invention provides a transfer apparatus comprising: a vacuum-forming chamber in which a transcription die and a forming product to which a pattern is transcribed from the transcription die are disposed face to face with each other; a movable body supporting one of the die and the forming product so as to allow the transcription die and the forming product to be movable closer to or away from each other; and a plurality of balance cylinders placed in parallel to a moving direction of the movable body and connected to the movable body via piston rods, respectively; a pressure detector detecting a pressure inside the vacuum-forming chamber; and a pressure control section changing the number of the balance cylinders to be actuated depending to an output of the pressure detector so as to cancel or reduce fluctuation in load acting on the movable body in the moving direction thereof due to pressure variation in the vacuum-forming chamber.

DETAILED DESCRIPTION OF THE PREFERRED EMBODIMENT

Figure 1:
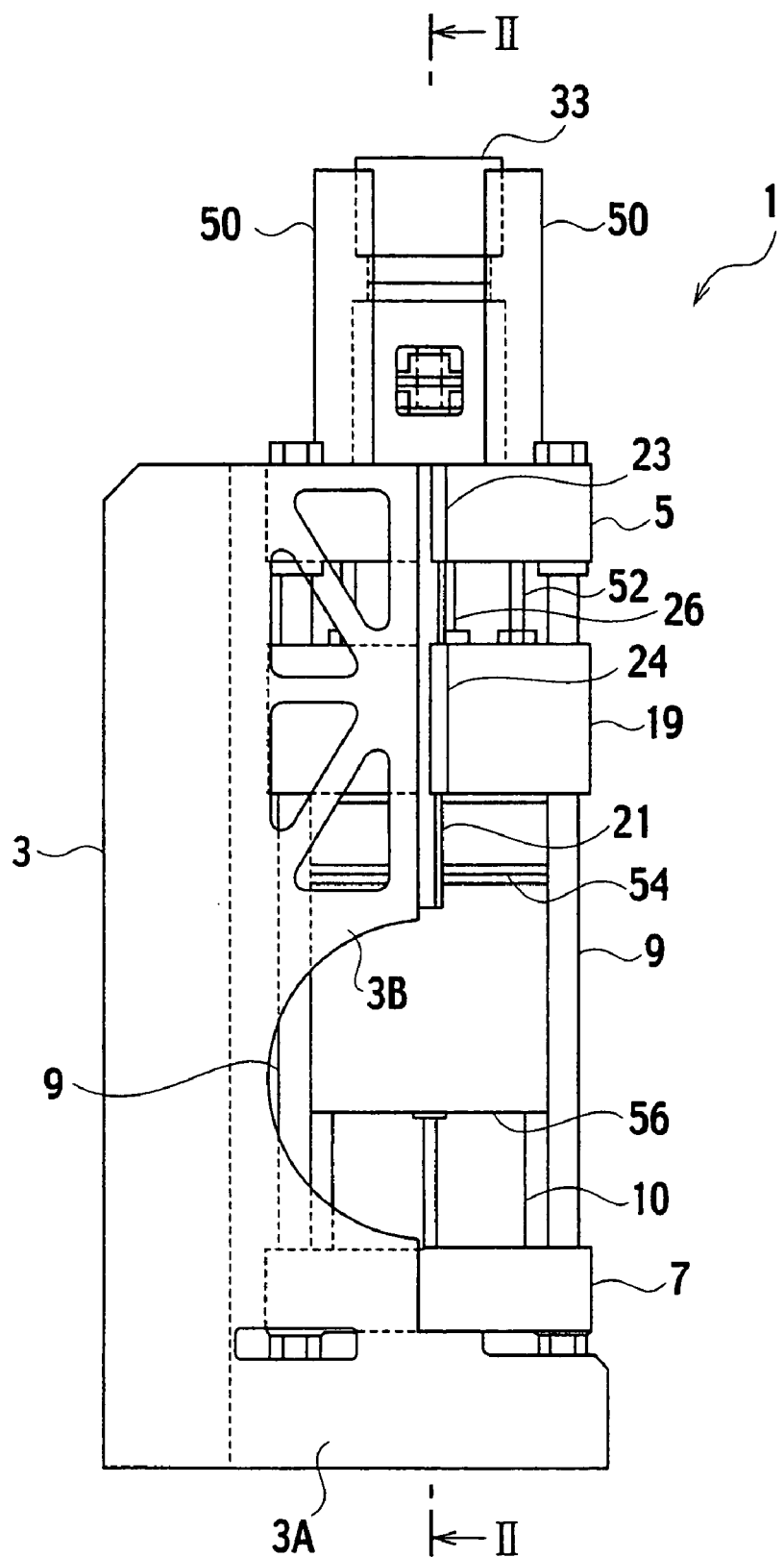
FIG. 1 is a left side view showing one embodiment of a transcript apparatus according to the present invention.
Figure 2:
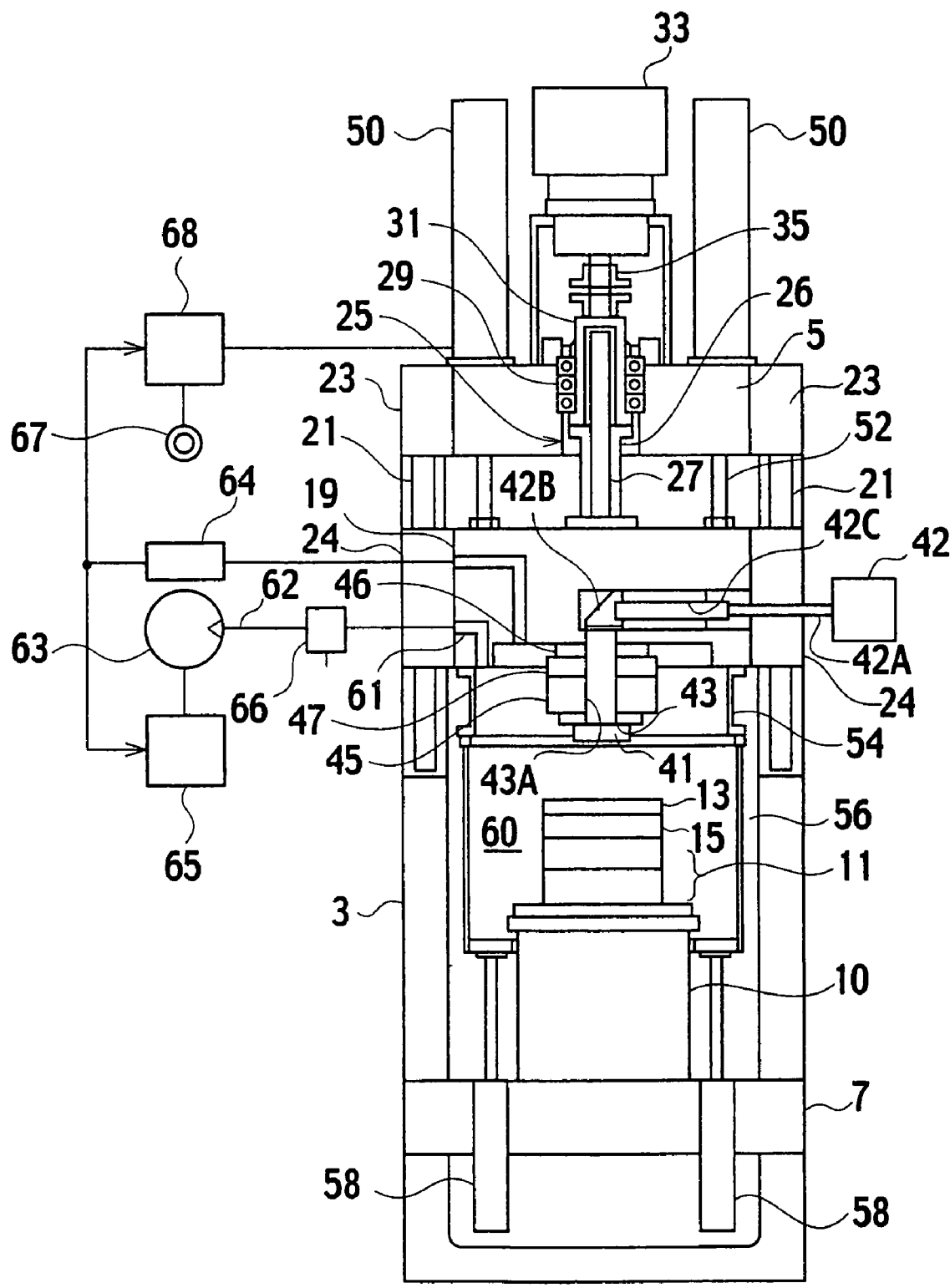
FIG. 2 is a cross sectional view taken along line II-II of FIG. 1.

As shown in FIGS. 1 and 2, a transcript apparatus 1 of one embodiment according to the present invention includes: a body frame 3 having a generally L-shaped side shape; a square-shaped lower frame (base frame) 7 integrally mounted on a lower side of a frame support section 3A by which the lower frame 7 is supported; die bars 9 standing upright from four corners of the lower frame 7 in parallel to a vertical section of the body frame 3; a square-shaped upper frame (support frame) 5 located on upper ends of the die bars 9 for supporting a drive means; and a square-shaped movable body 19 supported on the die bars 9 to be movable in a direction along the die bars 9 (vertical direction) in a space between the upper frame 5 and the lower frame 7.

The body frame 3 has an upper area formed with a pair of guide frames 3B, 3B. The guide frames 3B, 3B protrudes forward (rightward in FIG. 1) such that their end faces reach positions substantially half of left and right side faces of the upper frame 5 and the movable body 19. In addition, the guide frames 3B, 3B has distal ends provided with vertically extended linear guides (guide means) 21. The upper frame 5 and the movable frame 19 have left and right side surfaces carrying on sliders 23, 23 and sliders 24, 24, respectively. The sliders 23, 23 and the sliders 24, 24 engage the linear guides 21, 21, and are movably guided in a vertical direction with high precision under, for instance, zero clearance.

In summary, the body frame 3 has one end side (a lower side) provided with the frame support section 3A by which the lower frame (base frame) 7 is supported. Thus the body frame 3 is provided with a generally L-shaped configuration from a side view. The other end side (on an upper side) of the body frame 3 has left and right sides (a vertical direction in FIG. 3) provided with the guide frames 3B, 3B. The guide frames 3B, 3B have the linear guides 21, 21 and protrude forward. The body frame 3 is provided with a structure wherein the upper end side is formed with a concave portion.

Figure 3:
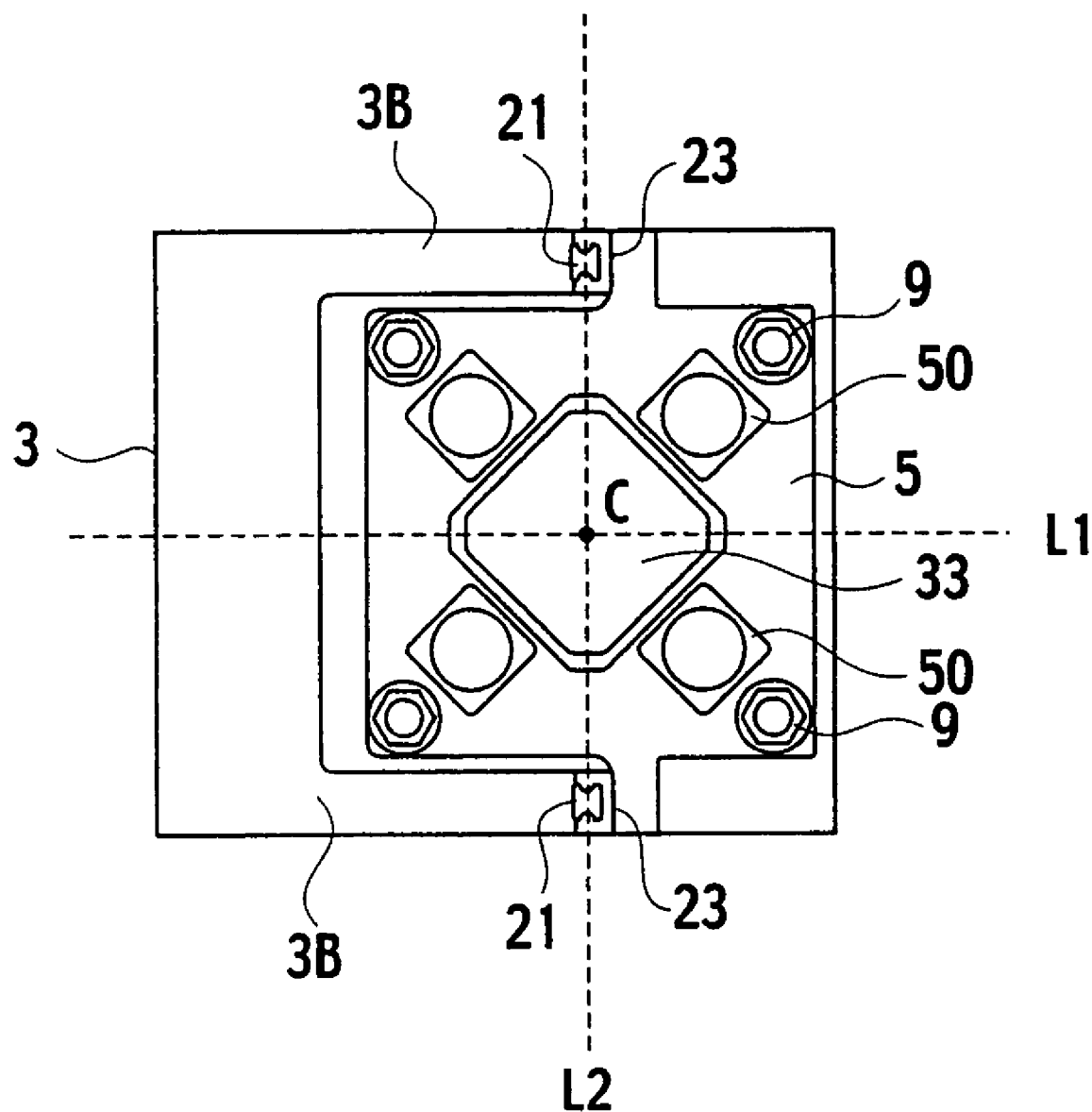
FIG. 3 is a plan view of the transcript apparatus shown in FIG. 1.

Moreover, as shown in FIG. 3, the upper frame 5 and the movable body 19 are disposed between the left and right guide frames 3B, 3B of the body frame 3. Engagement portions between the sliders 23, 23 and the sliders 24, 24 and the linear guides 21, 21 are located at positions symmetric to a center line L1 passing across the intersection C between the center line L1 extended in a back and forth direction (a lateral direction in FIG. 3) of the movable body 19 and a center line L2 extended in a horizontal direction (the vertical direction in FIG. 3). Here the sliders 23, 23 and the sliders 24, 24 are provided on the upper frame 5 and the movable body 19.

Also, while the linear guides 21, 21 of FIG. 1 are provided in common to the sliders 23, 23 and the sliders 24, 24, an alternative may be possible such that linear guides are separately provided for the sliders 23, 23 and the sliders 24, 24. However, when considered in ease of machining and machining precision on a mutually parallel alignment, the linear guides 21, 21 may be preferably provided in common to the sliders 23, 23 and the sliders 24, 24.

In order to avoid positional displacement (lateral displacement) between the upper frame 5 and the movable body 19 by temperature variations, the linear guides 21, 21, the sliders 23, 23, and the sliders 24, 24 may be preferably located at positions symmetric to the center line L1 passing across the intersection C between the center line L1 extended in the back and forth direction of the upper frame 5 and the movable body 19 and the center line L2 extending along the horizontal direction.

The lower frame 7 has an upper surface with a central area carrying on a stationary bed 10 that is vertically extended upward. As shown in FIG. 2, the stationary bed 10 carries on movable tables 11, including X- and Y-tables, which can be moved in X- and Y-directions (lateral and vertical directions) and can be positioned upon fine adjustments. The movable tables 11 carry on a support head 15 on which a forming product is supported. The movable tables 11 are guided by linear guides and sliders and driven by a servomotor, but the detailed description is omitted because of its well-known structure.

The forming product 13 is comprised of a thin film that a forming layer made of ultraviolet curing resin is applied on an upper surface of a substrate made of suitable material such as silicone, glass, or ceramics. The forming layer has a thickness in the order of several tens nanometers to several micrometers. If such a forming layer may possibly employs a resist made of thermoplastic resin, the support head 15 can incorporate a heating means (not shown) such as a heater to thermally soften the forming layer to provide ease of forming.

As shown in FIG. 2, the movable body 19 has a lower central area (a center of a surface opposite to the lower frame 7) carrying on a turntable 47 by means of a load cell 46. The turntable 47 can be turned about a center of the lower central area of the movable body- 19 and fixedly secured at a given angular position. A die support plate 43 is mounted on the turntable 47 by means of a horizontalizing (paralleling) mechanism 45, including a spherical joint and cruciform joint, and detachably carries a die 41.

The die 41 has the die surface (the lower surface in FIG. 2) on which a finely engraved pattern is formed by a lithographic technology. The die 41 is made of transparent quartz glass that is easy to transmit ultraviolet rays in the present embodiment.

All of the die support plate 43, the horizontalizing (paralleling) mechanism 45, the turntable 47, and the load cell 46 have central areas through which through-bores 43A is extended. The movable body 19 has a through-bore (light guide path) 42C which guides ultraviolet rays, emitted from an ultraviolet light source 42, from the through-bores 43A to a backside of the die 41 via an optical fiber 42A and a reflection mirror 42B.

The upper frame 5 as the support plate carries on a servomotor 33 as an example of a drive means to move the movable body 19. The servomotor 33 has an output shaft 35 coupled to a hollow shaft 31. The hollow shaft 31 is mounted on the upper frame 5 via a bearing 29 only for rotatable movement. The hollow shaft 31 has a lower end to which a ball screw nut 26 forming a ball screw mechanism 25 is fixedly mounted. The ball screw nut 26 engages a ball screw shaft 27 that is fixedly mounted onto the movable body 19 in a central axis of the movable table 19 for moving the movable body 19 up and down with a given speed and torque.

Mounted on the lower surface of the movable body 19 is a ring-shaped upper cover 54 by which the die support plate 43 is surrounded. On the contrary, mounted on the lower frame 7 is a ring-shaped lower cover 56 so as to surround the movable table 11. The ring shaped lower cover 5 has a lower end which engages a periphery of the stationary bed 10 for moving capability and an upper end which is formed to bring into abutting engagement with a lower end of the upper cover 54. The lower cover 56 is moved up and down by a plurality of cylinders 58 as an example of a vertical motion actuator. The cylinders 58 are mounted to the lower frame 7. The upper cover 54 and the lower cover 56 define an openable and closable forming chamber 60 around the die support plate 43 and the movable table 11.

The forming chamber 60 is connected to a vacuum pump (negative pressure generation means) 63 for depressurizing the forming chamber 16 via a flow passage 61 formed in the movable member 91 and a conduit 62 connected to the flow passage 61. The forming chamber 60 will be thus called a "vacuum-forming chamber (depressurized forming chamber)". A pressure inside the vacuum-forming chamber 60 is detected by a pressure detector 64 and an output of the pressure detector 64 is introduced to a pump drive control section 65 for the vacuum pump 63 to reduce the pressure inside the vacuum-forming chamber 60 to a given value. Also, a leak valve 66 is disposed in the path of the conduit 62 to return the pressure inside the vacuum-forming chamber 60 to an atmospheric pressure.

As shown in FIG. 3, a plurality of balance cylinders 50 (as an example of balance taking means) stands upright at positions symmetric with respect to a center of the movable member 19. The balance cylinders 50 have piston rods 52 connected to the movable member 19, respectively. The balance cylinders 50 are supplied with working fluid via a pressure control section 68 from a fluid pressure source 67 such an air pressure source or a hydraulic pressure source.

The pressure control section 68 loads an output from the pressure detector 64 to control the pressure of working fluid supplied to these balance cylinders 50 and to cancel a load acting on the movable body 19 downward due to a weight thereof as well as the variation of the load acting on the movable body 19 in a vertical direction (that is, in a moving direction of the movable body 19) caused by the variation of the pressure inside the vacuum-forming chamber 60.

Next, the operation of the transcript apparatus will be described.

The cylinders 58 are actuated to move the lower cover 56 downward, thereby opening the forming chamber 60. The die 41 is mounted onto the die support plate 43 and the turntable 7 finely adjusts a mount (rotation) angle of the die 41 in a horizontal direction about the center of the die 41. In addition, the mount angle adjustment for the die 41 may be automatically conducted with each forming product 13 set on the support head 15 by a well-known positioning means with the use of a marking.

After the die 41 is set in such a manner, the forming product 13, whose upper surface is coated with the forming layer made of ultraviolet curing resin, is set to the support head 15.

Subsequently, the cylinders 58 are actuated to lift the lower cover 56 upward, thereby closing the vacuum-forming chamber 60. The pump drive control section 65 depressurizes the pressure inside the vacuum-forming chamber 60 to a given value by actuating the vacuum pump 63. Then the pressure inside the vacuum-forming chamber 60 is detected by the pressure detector 64 and the output of the pressure detector 64 is introduced to the pump drive control section 65.

When the pressure inside the vacuum-forming chamber 60 remains under an atmospheric pressure, the movable member 19 is subject to only a downwardly acting load due to the own weight. Thus an output of the pressure detector 64 becomes zero. Then the pressure control section 68 controls the pressure of working fluid, supplied to the balance cylinders 50 from the fluid pressure source 67, so as to cancel only the downwardly acting load caused by the weight of the movable member 19.

The depressurization of the vacuum-forming chamber 60 generates downward force acting downward on the movable member 19 in FIG. 2 as well as generating upward force acting upward on the lower cover 56 and the stationary bed 10 with the same magnitude as the downward force. Since a component acting on the lower cover 56 of the upward force is transferred to the movable member 19 via the upper cover 54, a component of the downward force acting on the movable member 19, which corresponds to the component acting on the lower cover 56 of the upward force, is cancelled. However, since the upward force acting on the stationary bed 10 is not cancelled, a downward component, which corresponds to the upward force acting on the stationary bed 10, acts on the movable member 19. Consequently, the movable member 19 is subject to a downward load due to this downward force.

To cancel the variation of the load acting on the movable member 19 in a vertical direction thereof (that is, in a moving direction of the movable member 19), based on an output received from the pressure detector 64, the pressure control section 68 varies the pressure of working fluid supplied to the balance cylinders 50, depending on the pressure inside the vacuum-forming chamber 60, thereby increasing a force equivalent to the upward force acting on the stationary bed 10.

Next, the torque of the servomotor 33 is set up to a given value to move the movable body 19 downward, thereby pressing the die 41 to an upper surface of the forming product 13.

Then the linear guides 21, 21, ones that are disposed both sides in the upper area of the body frame 3, and the sliders 24, 24, ones that are held in engagement with the linear guides 21, 21, enable the movable body 19 to be moved downward with minimal positional displacement (lateral displacement) of the movable body 19 in a direction intersecting a movable direction of the movable body 19. Thus the die 14 can be brought into pressing engagement with the forming product 13 in a direction toward a given position. At this time, the balance cylinders 50 cancel load of the movable body 19 acting downward due to the gravity, and consequently, the servomotor 33 enables the movable body 19 to move downward with a precisely controlled speed and torque.

When this takes place, the cylinders 58 prevail under free statuses without pressing motions such that the lower cover 56 brings into close contact with the upper cover 54, and the cylinder 58 smoothly move upward or downward in association with vertical movements of the lower cover 56 when the lower cover 56 move upward or downward together with the movable body 19.

Further, since the paralleling mechanism 45 causes the lower surface of the die 41 to be paralleled to the upper surface of the forming product 13, the whole surface of the die 41 is pressed against the surface of the forming product 13 with a uniform surface pressure.

The load cell 46 detects the pressing force to allow the detected value to be fed back to the servomotor 33 such that the pressing force is maintained at a given value. Since the load cell 46 is placed inside the vacuum-forming chamber 60, the load cell 46 has no adverse affect arising from fluctuation in the pressure inside the vacuum-forming chamber 60. Accordingly, the pressing force is simply and reliably controlled.

In such a way, the die 41 is pressed against a forming layer, composed of ultraviolet curing resin coated over the upper surface of the forming product 13, with a given pressing force. Thus, a finely engraved pattern, formed over the surface of the die 41, is transcribed onto the forming layer of the forming product 13. Then, since the vacuum-forming chamber 60 is depressurized, air (inactive gas in case of the vacuum-forming chamber 60 prevailing under an inactive gas atmosphere) as forming atmosphere is not shut in between the die 41 and the forming layer of the forming product 13, and consequently a defect forming is not occurred.

Then the strong pressing force of the die 41 makes the die bars 9 slightly extended and the upper frame 5 displaced upward. However, since the linear guides 21, 21 and the sliders 23, 23 absorb such displacement of the upper frame 5, an upper portion of the body frame 3 to warp leftward as viewed in FIG. 2. This minimizes the positional displacement (lateral displacement) of the die 41 in a direction perpendicular to the moving direction of the die 41 by the pressing force of the die 41.

Further, even if the plural die bars 9 stretch in different with each other, the structure of the upper frame 5 supported by the linear guides 21, 21 and the sliders 23, 23 enables the positional displacement (lateral displacement) of the upper frame 5 to be minimized. Consequently, the positional displacement (lateral displacement) of the die 41 can be reduced to a minimal extent.

Moreover, since there exists an extremely slight difference in the extension of the die bars 9 if the pressing force of the die 41 is relatively small, the guide means for guiding the upper frame 5, including the linear guides 21, 21 and the sliders 23, 23 may be omitted.

After the transcribing step is completed, ultraviolet rays emitted from the ultraviolet light source 42 to a backside of the die 41 through the light guide path, which is composed of the optical fiber 42A and the reflection mirror 42B, for a given time interval. Since the die 41 is made of transparent quartz glass, ultraviolet rays radiated to the backside of the die 41 pass through the die 41 and are then radiated to the forming layer, which is made of ultraviolet curing resin and coated over the upper surface of the forming product 13. Consequently, the forming layer is hardened.

After the forming layer is hardened in such a way, the servomotor 33 is driven to lift the movable body 19 to remove the die 41 away from the forming product 13 while keeping the die 41 in a fixed attitude. Subsequently, the cylinders 58 are actuated to move the lower cover 56 downward for opening the forming chamber 60, and after the forming product 13 is taken out, the transcription operation is completed.

While the present embodiment has been described with reference to a structure wherein the movable body 19 is moved up and down using four pieces of balance cylinders 50, in general any plurality of balance cylinders may be used, and all the balance cylinders 50 are not necessarily actuated at all times. Under a situation where the vacuum-forming chamber 60 remains under the atmospheric pressure, for instance, two pieces of balance cylinders 50, which are placed on a diagonal line, may be rendered operative so as to cancel the weight of the movable member 19. If even numbers of cylinders 50 more that four are used, cylinders 50, which jump over one piece, may be actuated. Then, in a case where the vacuum-forming chamber 60 is brought into a depressurized status, all the balance cylinders 50 may be rendered operative.

That is, the balance cylinders 50 may be grouped into a plurality of balance cylinders 50 for supporting the weight of the movable member 19 and another plurality of balance cylinders 50 for being balanced to the downward force acting on the movable body 19 downward when the vacuum-forming chamber 60 is depressurized. In this case the weights of the movable member 19 involving the die 41 are nearly fixed, and therefore the pressure of working fluid supplied to the balance cylinders 50 for the respective groups can be easily controlled under situations that an evacuated pressure (vacuum level) inside the vacuum-forming chamber 60 is nearly fixed at all times.

The number of the balance cylinders 50 to be actuated, as mentioned above, can be changed according to a given setting condition for a pressure state in the vacuum-forming chamber 60, or can be changed by feeding back an output from the pressure detector 64 to the pressure control section 68.

In other words, since the respective groups of the balance cylinders 50 target a different balanced object, the pressure of working fluid supplied to the balance cylinder 50 can be easily controlled in correspondence to a depressurized level (vacuum level) of the vacuum-forming chamber 60.

Such a structure mentioned above can minimize influences of depressurization even if the pressure inside the vacuum-forming chamber 60 is fluctuated. In addition, a contact pressure (transcription pressure) between the die 41 and the forming product 13 can be precisely controlled in compliance with material of the forming layer, thereby enabling high-precision transcription to be performed.

The present invention is not limited to the present embodiment and various alterations may be suitably implemented in other embodiments. For instance, while in the present embodiment the movable body 19 located on the upper frame 5 is provided with vertical movability to the stationary bed 10 mounted on the lower frame 7, the vertical movability of the movable body 19 is relative to that of the stationary bed 10 (that is, the vertical movability of the die 41 is relative to that of the forming product 13), and therefore consequently, an alternative structure may be allowable such that the stationary bed 10 is rendered vertically movable and the movable body 19 is made stationary. Further, while in the present embodiment the die 41 is mounted on the movable body 19 and the forming product 13 is mounted on the lower frame 7, these may be mounted in an opposite way. Additionally, the structure shown in FIGS. 1 and 2 may be arranged in an upside down configuration or may be arranged in laid down configuration. That is, while the present embodiment has been exemplarily described with reference to a vertical type structure, the present invention may also be implemented in a vertical structure with component parts arranged in an upside down configuration or in a transverse configuration. Furthermore, various structures may be adopted including those in which the servomotor 33 is mounted on the lower frame 7 and the die 41 and the forming product 13 are disposed between the upper frame 5 and the movable body 19.

Further, for the forming layer, any type of materials such as ultraviolet ray curing resin, thermoplastic resin or other materials may be employed and related softening and/or hardening means may be selectively used depending on materials selected for 10 the forming layer. Moreover, the die 41 may be set onto the lower frame 7 and the forming product 13 may be mounted on the movable member 19. When this takes place, both softening means and/or hardening means may be modified for the forming layer.

In such a way, according to the present invention, when after depressurized, the pressure of the vacuum-forming chamber (depressurized forming chamber) is returned to the atmospheric pressure, the balance cylinders cancel fluctuation in load that act on the movable member in a moving direction thereof due to pressure variation in the vacuum-forming chamber. Therefore an adverse affect arising from pressure variation in the vacuum-forming chamber is minimized, and the forming can be simply and reliably performed.

Also, the load cell for detecting the pressing force acting between the die and the forming product may be preferably located inside the vacuum-forming chamber. Such an arrangement allows the load cell to have no adverse affect arising from pressure variation in the vacuum-forming chamber, thereby enabling the forming to be further accurately achieved.

The entire content of Japanese Patent Application No. P2005-137368 with a filing data of May 10, 2005 of which is expressly incorporated herein by reference in its entirety.

What is claimed is:

1. A transfer apparatus comprising:
   a vacuum-forming chamber in which a transcription die and a forming product to which a pattern is transcribed from the transcription die are disposed face to face with each other;
   a movable body supporting one of the die and the forming product so as to allow the transcription die and the forming product to be movable closer to or away from each other; and
   a plurality of balance cylinders placed in parallel to a moving direction of the movable body and connected to the movable body via piston rods, respectively;
   a pressure detector detecting a pressure inside the vacuum-forming chamber; and
   a pressure control section changing the number of the balance cylinders to be actuated depending on an output of the pressure detector so as to cancel or reduce fluctuation in load acting on the movable body in the moving direction thereof due to pressure variation in the vacuum-forming chamber.

2. The transfer apparatus according to claim 1, further comprising a load cell, detecting a pressing force acting between the transcription die and the forming product, which is disposed inside the vacuum-forming chamber.

* * * * *